(12) United States Patent
Jones et al.

(10) Patent No.: US 11,292,493 B2
(45) Date of Patent: Apr. 5, 2022

(54) VEHICLE OPERATION MODES

(71) Applicant: Ford Global Technologies, LLC, Dearborn, MI (US)

(72) Inventors: Ryan Jones, Canton, MI (US); Alexander Jaeckel, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 153 days.

(21) Appl. No.: 16/750,684

(22) Filed: Jan. 23, 2020

(65) Prior Publication Data

US 2021/0229706 A1    Jul. 29, 2021

(51) Int. Cl.
| | |
|---|---|
| *B60W 60/00* | (2020.01) |
| *G05D 1/00* | (2006.01) |
| *G05D 1/02* | (2020.01) |
| *B60W 50/14* | (2020.01) |

(52) U.S. Cl.
CPC ........ *B60W 60/0055* (2020.02); *B60W 50/14* (2013.01); *G05D 1/0061* (2013.01); *G05D 1/0088* (2013.01); *G05D 1/0223* (2013.01); *B60W 2420/24* (2013.01); *B60W 2520/10* (2013.01); *B60W 2540/223* (2020.02); *B60W 2552/30* (2020.02); *B60W 2720/10* (2013.01); *G05D 2201/0213* (2013.01)

(58) Field of Classification Search
CPC ............. B60W 50/14; B60W 60/0055; B60W 2554/223; B60W 2552/30; B60W 2420/24; B60W 2520/10; B60W 60/005; B60W 60/0057; B60W 60/0061; B60W 60/0051

See application file for complete search history.

(56) References Cited

U.S. PATENT DOCUMENTS

| | | | |
|---|---|---|---|
| 8,818,608 B2 | 8/2014 | Cullinane et al. | |
| 9,594,373 B2 * | 3/2017 | Solyom | G08G 1/16 |
| 9,908,534 B2 * | 3/2018 | Desnoyer | B60W 30/16 |

(Continued)

FOREIGN PATENT DOCUMENTS

GB    2572206    * 9/2019    ........ B60W 60/0054

*Primary Examiner* — Peter D Nolan
*Assistant Examiner* — Kenneth M Dunne
(74) *Attorney, Agent, or Firm* — Frank A. MacKenzie; Bejin Bieneman PLC

(57) ABSTRACT

A computer includes a processor and a memory storing instructions executable by the processor to determine, for a host vehicle operating in a first operation mode, a first operation mode transition location based on a time to transition the host vehicle from the first operation mode to a second operation mode, a current speed of the host vehicle, and a distance from the host vehicle to an operation mode transition boundary location, to determine a second operation mode transition location that is a specified distance from the first operation mode transition location, the specified distance based on the current host vehicle speed, to transition from the first operation mode to the second operation mode upon reaching the first operation mode transition location, and to transition from the second operation mode to the first operation mode when the second operation mode transition location is between a current location of the host vehicle and the operation mode transition boundary location.

20 Claims, 5 Drawing Sheets

(56) References Cited

U.S. PATENT DOCUMENTS

| | | | |
|---|---|---|---|
| 2016/0378114 A1* | 12/2016 | Laur | B60W 50/14 |
| | | | 701/23 |
| 2017/0212512 A1* | 7/2017 | Schmid | G05D 1/0061 |
| 2017/0351256 A1* | 12/2017 | Kumakiri | G05D 1/0061 |
| 2018/0046185 A1* | 2/2018 | Sato | B60W 50/14 |
| 2018/0088574 A1* | 3/2018 | Latotzki | G05D 1/0251 |
| 2018/0229743 A1* | 8/2018 | Aoi | B60W 40/08 |
| 2019/0004513 A1 | 1/2019 | Chiba et al. | |
| 2019/0011914 A1* | 1/2019 | Park | B60W 50/14 |
| 2019/0111944 A1* | 4/2019 | Nagahashi | B60W 30/182 |
| 2019/0317492 A1* | 10/2019 | Choi | B60W 50/029 |
| 2019/0324451 A1* | 10/2019 | Obata | B60W 50/14 |
| 2020/0017124 A1* | 1/2020 | Camhi | G06N 20/00 |
| 2020/0201321 A1* | 6/2020 | Tanaka | G05D 1/0223 |
| 2020/0231181 A1* | 7/2020 | Miyahara | B60W 50/14 |
| 2020/0307641 A1* | 10/2020 | Oyama | G05D 1/0088 |
| 2020/0339160 A1* | 10/2020 | Rosenbaum | B60W 60/0057 |

* cited by examiner

VEHICLE OPERATION MODES

BACKGROUND

Vehicles may operate autonomously or semiautonomously, i.e., without input from a human operator to control some or all driving operations, e.g., some or all of steering, propulsion (e.g., throttle), and braking. Autonomous or semiautonomous operation may not be suitable and/or desired for all driving situations. For example, at a specified location in a roadway, semiautonomous or manual operation may be suitable.

DETAILED DESCRIPTION

Figure 1:
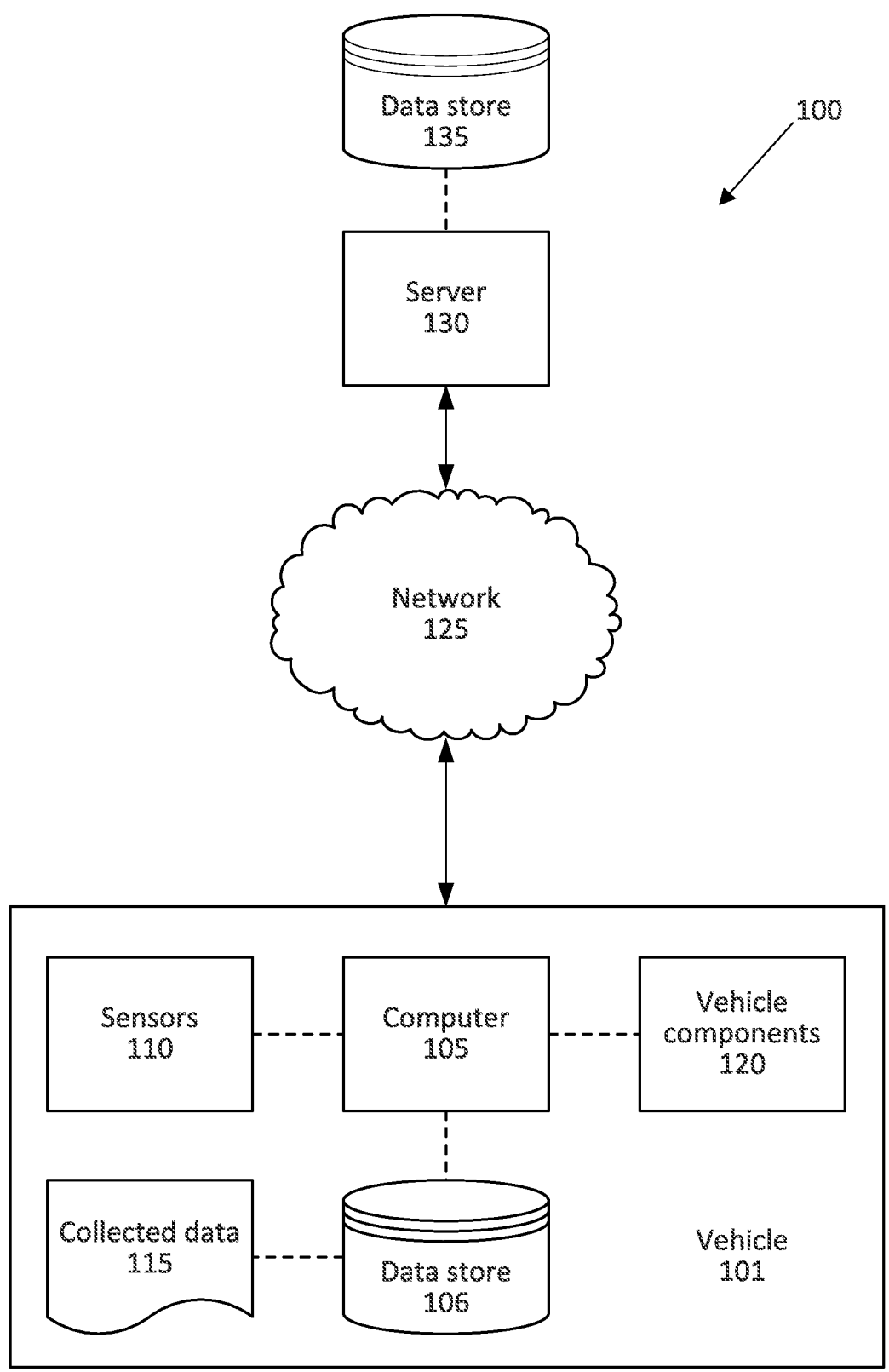
FIG. 1 is a block diagram of an example system for operating a host vehicle.

A system includes a computer including a processor and a memory, the memory storing instructions executable by the processor to determine, for a host vehicle operating in a first operation mode, a first operation mode transition location based on a time to transition the host vehicle from the first operation mode to a second operation mode, a current speed of the host vehicle, and a distance from the host vehicle to an operation mode transition boundary location, determine a second operation mode transition location that is a specified distance from the first operation mode transition location, the specified distance based on the current host vehicle speed, wherein the first operation mode transition location is between the operation mode transition boundary location and the second operation mode transition location, transition from the first operation mode to the second operation mode upon reaching the first operation mode transition location, and transition from the second operation mode to the first operation mode when the second operation mode transition location is between a current location of the host vehicle and the operation mode transition boundary location.

The instructions can further include instructions to actuate a brake to slow the host vehicle below a speed threshold upon transitioning from the first operation mode to the second operation mode.

The instructions can further include instructions to, after determining the first and second operation mode transition locations, determine a new speed of the host vehicle and to then determine new first and second operation mode transition locations based on the new speed.

The instructions can further include instructions to, upon determining the new first and second operation mode transition locations, maintain the second operation mode or the first operation mode when a current location of the host vehicle is between the new first and second operation mode transition locations.

The instructions can further include instructions to, upon determining the new first and second operation mode transition locations, transition from the first operation mode to the second operation mode when a new current location of the host vehicle is between the new first operation mode transition location and the operation mode transition boundary location and to transition from the second operation mode to the first operation mode when the new second operation mode transition location is between the current location of the host vehicle and the operation mode transition boundary location.

The instructions can further include instructions to, upon transitioning to the second operation mode, instruct an occupant to engage a steering wheel.

The instructions can further include instructions to complete transition to the second operation mode upon detecting a hand of the occupant on the steering wheel.

The instructions can further include instructions to detect the hand of the occupant on the steering wheel when a torque sensor detects a torque on the steering wheel exceeding a threshold.

The instructions can further include instructions to detect the hand of the occupant on the steering wheel when a capacitive sensor detects a change in capacitance exceeding a threshold.

The instructions can further include instructions to, upon determining to transition to the second operation mode, provide a message to an occupant to engage a steering wheel.

The instructions can further include instructions to, when the host vehicle is in the autonomous mode and the current location of the host vehicle is between the first operation mode transition location and the operation mode transition boundary location, suppress the message to the occupant and transition to the second operation mode.

The instructions can further include instructions to, upon reaching the operation mode transition boundary location, identify a second operation mode transition boundary location and transition from the second operation mode to the first operation mode upon reaching the second operation mode transition boundary location.

The instructions can further include instructions to, after transitioning from the first operation mode to the second operation mode upon reaching the first operation mode transition location, transition from the second operation mode to a manual mode.

The operation mode transition boundary location can be a location at which a curvature of a roadway exceeds a curvature threshold.

A method includes determining, for a host vehicle operating in an first operation mode, a first operation mode transition location based on a time to transition the host vehicle from the first operation mode to a second operation mode, a current speed of the host vehicle, and a distance from the host vehicle to an operation mode transition boundary location, determining a second operation mode transition location that is a specified distance from the first operation mode transition location, the specified distance based on the current host vehicle speed, wherein the first operation mode transition location is between the operation mode transition boundary location and the second operation mode transition location, transitioning from the first operation mode to the second operation mode upon reaching the first operation mode transition location, and transitioning from the second operation mode to the first operation mode when the second operation mode transition location is between a current location of the host vehicle and the operation mode transition boundary location.

The method can further include actuating a brake to slow the host vehicle below a speed threshold upon transitioning from the first operation mode to the second operation mode.

The method can further include, after determining the first and second operation mode transition locations, determining a new speed of the host vehicle and then determining new first and second operation mode transition locations based on the new speed.

The method can further include, upon determining the new first and second operation mode transition locations, maintaining the second operation mode or the first operation mode when a current location of the host vehicle is between the new first and second operation mode transition locations.

The method can further include, upon determining the new first and second operation mode transition locations, transitioning from the first operation mode to the second operation mode when a new current location of the host vehicle is between the new first operation mode transition location and the operation mode transition boundary location and transitioning from the second operation mode to the first operation mode when the new second operation mode transition location is between the current location of the host vehicle and the operation mode transition boundary location.

The method can further include, upon transitioning to the second operation mode, instructing an occupant to engage a steering wheel.

The method can further include completing transition to the second operation mode upon detecting a hand of the occupant on the steering wheel.

The method can further include detecting the hand of the occupant on the steering wheel when a torque sensor detects a torque on the steering wheel exceeding a threshold.

The method can further include detecting the hand of the occupant on the steering wheel when a capacitive sensor detects a change in capacitance exceeding a threshold.

The method can further include, upon determining to transition to the second operation mode, providing a message to an occupant to engage a steering wheel.

The method can further include, when the host vehicle is in the autonomous mode and the current location of the host vehicle is between the first operation mode transition location and the operation mode transition boundary location, suppressing the message to the occupant and transition to the second operation mode.

The method can further include, upon reaching the operation mode transition boundary location, identifying a second operation mode transition boundary location and transition from the second operation mode to the first operation mode upon reaching the second operation mode transition boundary location.

The method can further include, after transitioning from the first operation mode to the second operation mode upon reaching the first operation mode transition location, transitioning from the second operation mode to a manual mode.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Rapid and numerous transitions between different autonomous vehicle operation modes can cause redundant and inefficient, energy-costing actuation of components as a vehicle computer transitions back and forth between the operation modes. Adjusting locations to transition between operation modes of a vehicle based on the vehicle speed allows the vehicle to transition into the semiautonomous mode prior to reaching a geofence, i.e., a location at which semiautonomous operation is preferred. That is, continuously using vehicle speed to determine when to reduce autonomous functionality for the vehicle allows the vehicle to remain in the autonomous mode longer than assuming a single vehicle speed and possibly transitioning to the semiautonomous mode earlier than necessary. Determining two movable transition locations prevents rapid transitioning between the autonomous and semiautonomous modes by providing a transition maintenance buffer zone. Reducing component actuation from the transition between the operation modes by preventing the rapid transitioning can reduce computations performed by a vehicle computer and can reduce wear on components that may be actuated during the transition. For example, if, upon transitioning to the autonomous mode, the vehicle computer rotates an occupant's seat to face a vehicle-forward direction, reducing rapid transitions between operation modes can reduce total rotations of the occupant's seat. If the computer determines that the location of the vehicle is between the movable transition locations, the computer maintains the current operation mode, reducing the number of transitions between the autonomous and semiautonomous modes. Thus, using changes in the vehicle's speed to determine the movable transition locations reduces the number of operation mode transitions while completing transition to the semiautonomous mode at a boundary location.

FIG. 1 illustrates an example system 100 for operating a host vehicle 101. A computer 105 in the host vehicle 101 is programmed to receive collected data 115 from one or more sensors 110. For example, vehicle 101 data 115 may include a location of the host vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus such as a CAN bus, LIN bus etc., and or other wired and/or wireless technologies, e.g., Ethernet, WIFI, etc. Via the network, bus, and/or other wired or wireless mechanisms (e.g., a wired or wireless local area network in the host vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110. The data store 106 can be a separate device from the computer 105, and the computer 105 can retrieve information stored by the data store 106 via a network in the vehicle 101, e.g., over a CAN bus, a wireless network, etc. Alternatively or additionally, the data store 106 can be part of the computer 105, e.g., as a memory of the computer 105.

Sensors 110 can include a variety of devices. For example, various controllers in a vehicle 101 may operate as sensors 110 to provide data 115 via the host vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The host vehicle 101 can include a plurality of vehicle components 120. In this context, each vehicle component 120 includes one or more hardware components adapted to perform a mechanical function or operation—such as moving the host vehicle 101, slowing or stopping the host vehicle 101, steering the host vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

As used herein, an "operation mode" is a set of instructions for the computer 105 prescribing operating limits for each vehicle component 120. When the computer 105 operates the host vehicle 101, the host vehicle 101 is an "autonomous" vehicle 101. For purposes of this disclosure, the term "autonomous vehicle" is used to refer to a vehicle 101 operating in a fully autonomous mode, i.e., an "autonomous" operation mode. A fully autonomous mode is defined as one in which each of vehicle 101 propulsion (typically via a powertrain including an electric motor and/or internal combustion engine), braking, and steering are controlled by the computer 105. A semiautonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the host vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
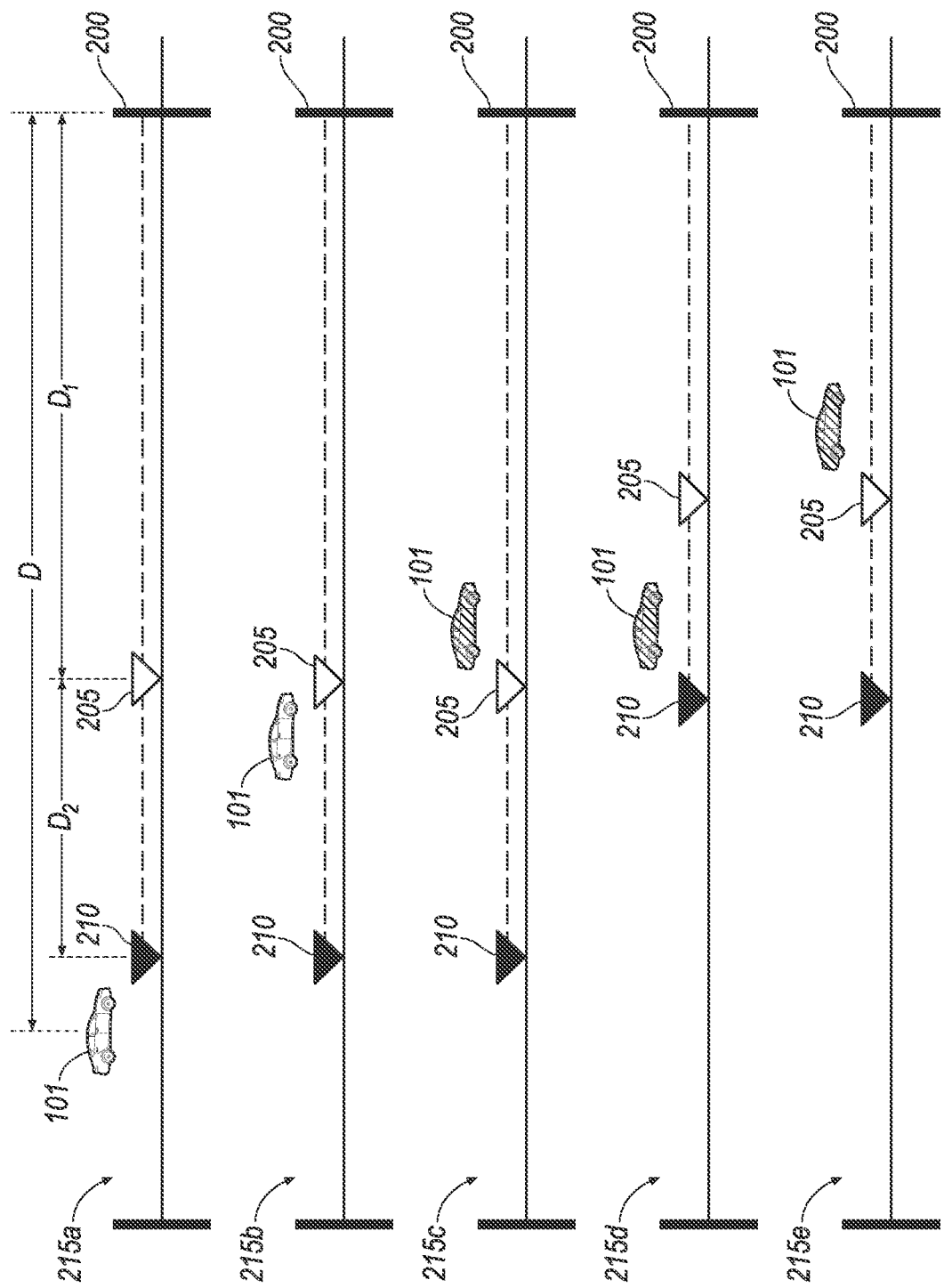
FIG. 2 is a diagram of the host vehicle transitioning from an autonomous mode to a semiautonomous mode.
Figure 3:
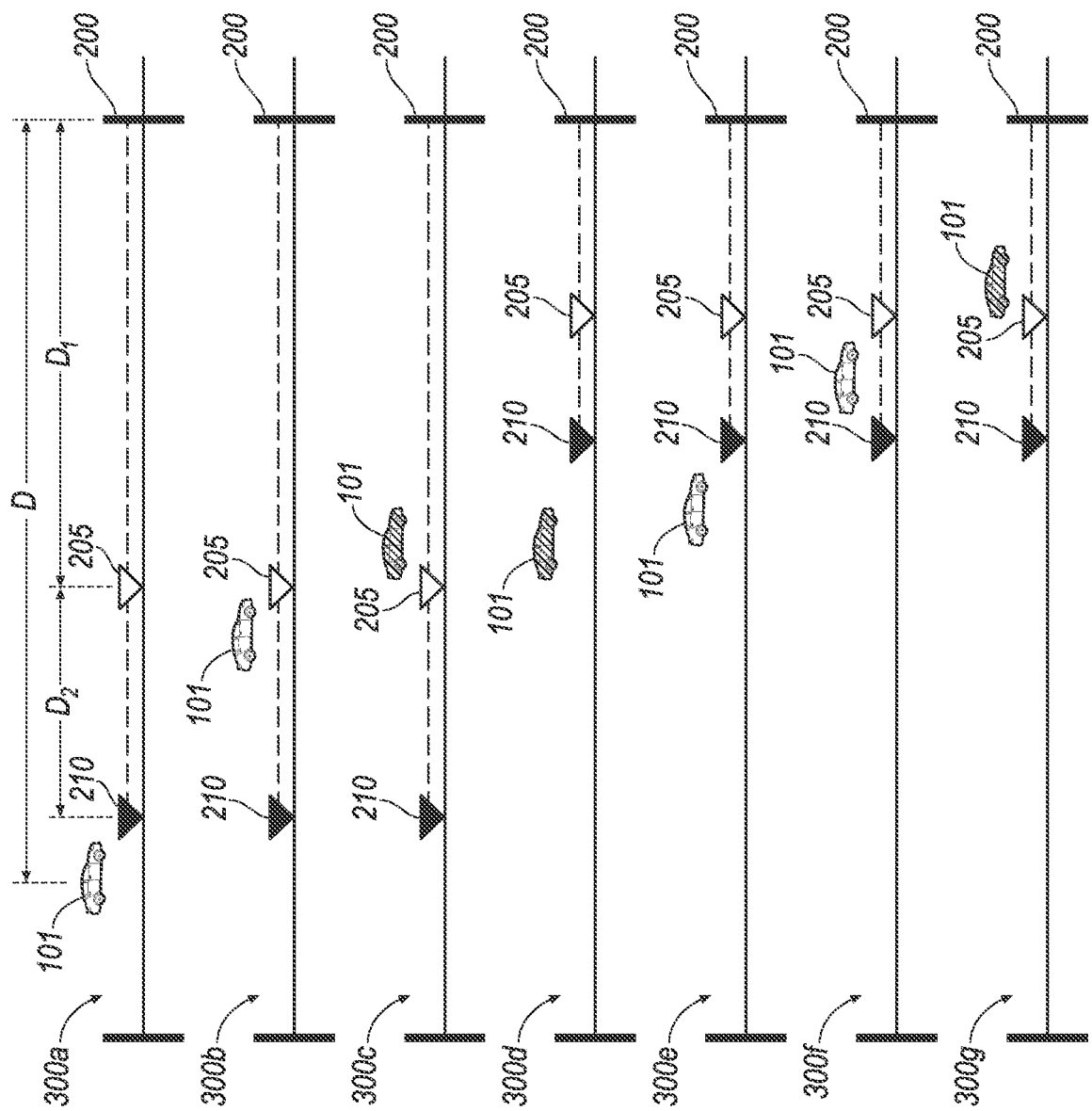
FIG. 3 is a diagram of the host vehicle transitioning from the semiautonomous mode to the autonomous mode.
Figure 4:
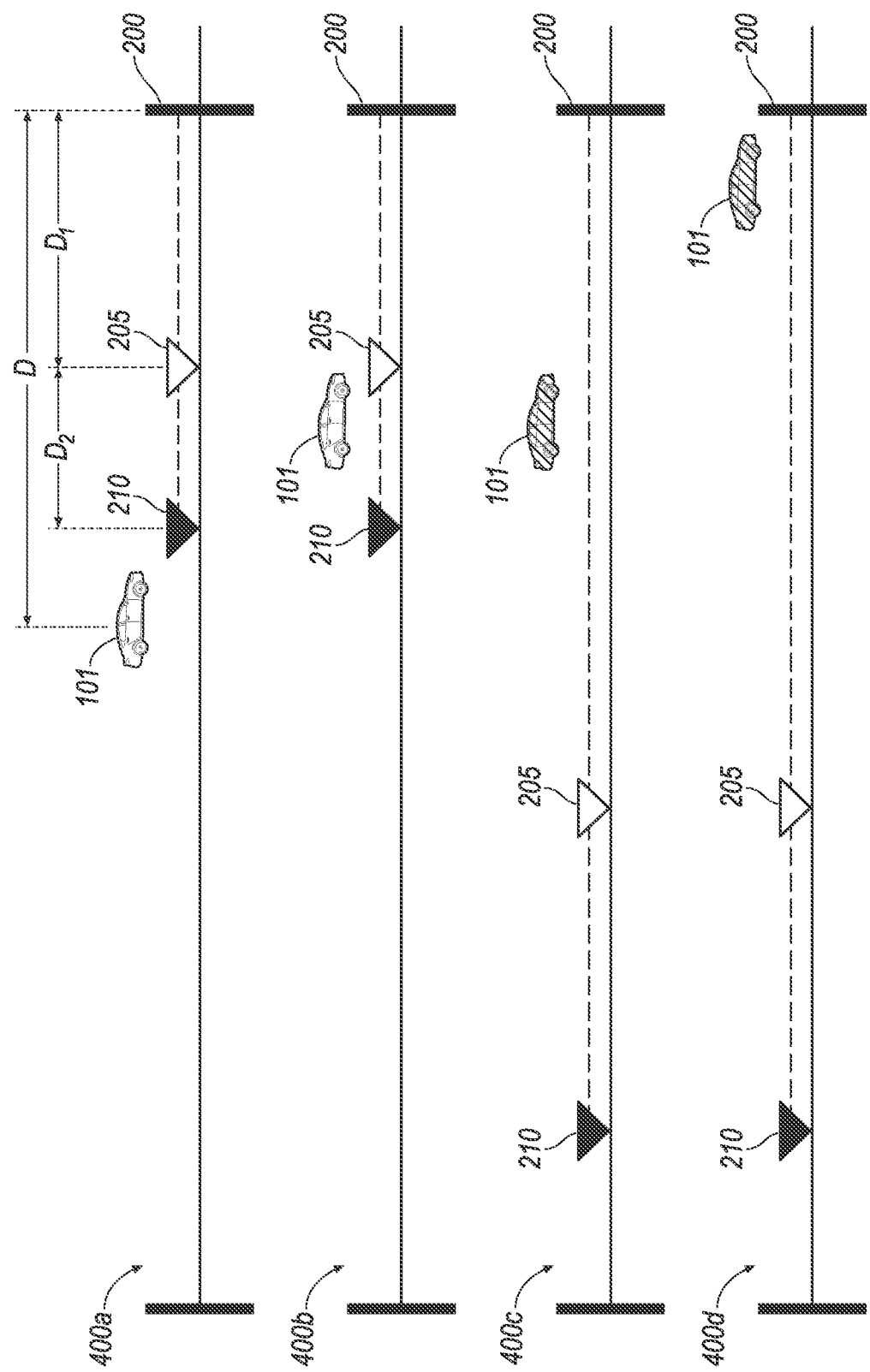
FIG. 4 is a diagram of the host vehicle transitioning from the autonomous mode to the semiautonomous mode.

FIG. 2 is a diagram of the host vehicle 101 transitioning from a first operation mode to a second operation mode. In the examples of FIGS. 2-4, the first operation mode is an autonomous mode, and an unshaded vehicle 101 represents the host vehicle 101 operating in the autonomous mode. The second operation mode is a semiautonomous mode, and a shaded vehicle 101 represents the host vehicle 101 operating in the semiautonomous mode. The computer 105 can identify an operation mode transition boundary location 200 based on location data, typically provided from the server 130, as explained further below. The operation mode transition boundary location 200 is a location at which the host vehicle 101 should operate in an operation mode with at least some input from a human operator, e.g., a semiautonomous mode, a manual mode, etc. That is, the operation mode transition boundary location 200 is a set of geo-coordinates identified by the server 130 that can require input from the human operator.

For example, the operation mode transition boundary location 200 can be a location at which a curve in a roadway has a curvature exceeding a predetermined curvature threshold. The curvature threshold can be determined based on simulation experiments of virtual vehicles 101 operating in an autonomous mode in curves of different curvatures, and the curvature threshold can be the curvature at which, in the autonomous mode, the host vehicle 101 exits a current roadway lane in the curve. Alternatively or additionally, the operation mode transition boundary location 200 can be a location at which additional operator attention can be required, e.g., a location with pedestrians, a neighborhood, a school zone, a roadway with debris and/or precipitation, etc. The computer 105 can receive a plurality of operation mode transition boundary locations 200 from the server 130, i.e., locations identified in a map stored on the server 130 that would require additional operator attention.

In the example of FIGS. 2-4, the first operation mode is an autonomous mode, and the second operation mode is a semiautonomous mode. Alternatively, the first operation mode can be a fully autonomous mode and the second operation mode can be a limited autonomous mode, and the computer 105 can transition the host vehicle 101 from the fully autonomous mode to the limited autonomous mode. In the "limited autonomous mode," each of the propulsion, steering, and brake are controlled by the computer 105 (as in the fully autonomous mode) and the human operator is in a position to assume manual control of the host vehicle 101. For example, in the limited autonomous mode, the operator's hands can engage the steering wheel, the seat in which the operator is sitting can be rotated toward the front of the host vehicle 101, the accelerator and brake pedals can be deployed toward the operator's feet, etc. That is, in the limited autonomous mode, the operator can be engaged with the host vehicle 101 such that the operator can provide input to the propulsion, steering, and/or brake while the computer 105 primarily controls the host vehicle 101.

The computer 105 can determine a first operation mode transition location 205. The first operation mode transition location 205 is a location at which the computer 105 begins transitioning from first operation mode (e.g., the autonomous mode) to the second operation mode (e.g., the semi-autonomous mode or the limited autonomous mode) prior to reaching the operation mode transition boundary location 200. The first operation mode transition location 205 is based on a time to transition $T_1$ the host vehicle 101 from the first operation mode to the second operation mode, a current speed v of the host vehicle 101, and a distance D from the host vehicle 101 to the operation mode transition boundary location 200. That is, the computer 105 can determine the first operation mode transition location 205 as the location from the operation mode transition boundary location 200 at which, at the current vehicle 101 speed, the computer 105 would complete transition to the second operation mode upon reaching the operation mode transition boundary location 200. The first operation mode transition location 205 is thus a distance $D_1 = v \cdot T_1$ from the operation mode transition boundary location 200. The time to transition $T_1$ can be stored in a computer 105 memory or the like and can include, e.g., a time to rotate a rotatable seat to a vehicle-forward direction, a time to allow the occupant to engage the steering wheel, etc., e.g., as determined by empirical testing of one or more actions for an operator to be ready to assume control of a vehicle 101.

The computer 105 can determine a second operation mode transition location 210. The second operation mode transition location 210 is a specified distance $D_2$ from the first operation mode transition location 205 based on the current vehicle 101 speed. The specified distance can be a distance traveled at the current vehicle 101 speed for a specified time $T_2$. The specified time $T_2$ can be stored in a computer 105 memory or the like and can be a specified minimum manufacturer-recommended time that the host vehicle 101 should maintain the current operation mode to prevent rapid and redundant transitions between operation modes, reducing actuation of components associated with transitioning between the operation modes. The specified time $T_2$ can be a time to transition from the semiautonomous mode to the autonomous mode, e.g., 10 seconds. That is, the specified time $T_2$ can be determined such that as the computer 105 determines the first and second operation mode transition locations 205, 210, the computer 105 would not transition back to the autonomous mode prior to reaching the first operation mode transition location 205, at which point the computer 105 would subsequently transition to the semiautonomous mode. The specified time $T_2$ thus prevents transitioning between operation modes for periods of time less than the manufacturer-recommended time, preventing additional or redundant actuation of components (such as movable seats and steering wheels).

When the current location of the host vehicle 101 is between the first and second operation mode transition locations 205, 210, the computer 105 can maintain a current operation mode of the host vehicle 101. In this context, a location is "between" a first location and a second location when a path of travel extending from the first location to the second location passes through the location. For example, when the location of the vehicle 101 is between the first and second operation mode transition locations 205, 210, a planned path of travel that the vehicle 101 follows from the first operation mode transition location 205 to the second operation mode transition location 210 passes through the location of the vehicle 101. The boundary location 200 and the first and second operation mode transition locations 205, 210 are shown as points on a straight line, and the locations 200, 205, 210 can be along a different path of travel, e.g., including curves, angular paths in a grid, etc. The computer 105 can transition the vehicle from the second operation mode to the first operation mode when the second operation mode transition location 210 is between a current location of the host vehicle 101 and the operation mode transition boundary 200.

The computer 105 can actuate a brake 120 to slow the host vehicle 101 below a speed threshold upon transitioning from the first operation mode to the second operation mode. At the operation mode transition boundary location 200, the host vehicle 101 may operate at a slower speed than the host vehicle 101 operating before reaching the operation mode transition boundary location 200 to account for the terrain that required transitioning to the second operation mode. For example, if the curvature of the roadway is specified for operation in the semiautonomous mode but not the fully autonomous mode, the host vehicle 101 should operate at a slower speed than in a straight-path roadway. The speed threshold can be determined based on the characteristics of the roadway at the operation mode transition boundary location 200. For example, the speed threshold can be a predetermined value (e.g., 25 miles per hour) or a set value below a posted speed limit (e.g., 20 mph below the posted speed limit).

The computer 105 can continually, e.g., on an ongoing periodic basis, update the first and second operation mode transition locations 205, 210 based on new determinations of the host vehicle 101 speed v. That is, after determining the first and second operation mode transition locations 205, 210, the computer 105 can determine a new speed v of the host vehicle 101 and then determine new (or updated) first and second operation mode transition locations 205, 210 based on the new speed v. As described above, the first operation mode transition location 205 is based on a time for the host vehicle 101 to reach the operation mode transition boundary location 200 at the current speed v. When the current speed v drops, e.g., from traffic, the time to reach the operation mode transition boundary location 200 increases, and the distance $D_1$ decreases, moving the first operation mode transition location 205 closer to the operation mode transition boundary location 200. Thus, the first operation mode transition location 205 can, after determining a new speed v, move between the host vehicle 101 and the operation mode transition boundary location 200. When the host vehicle 101 has already transitioned to the second operation mode after reaching the first operation mode transition location 205, the computer 105 may determine to transition back to the first operation mode if the first operation mode transition location 205 is between the location of the host vehicle 101 and the operation mode transition boundary location 200.

To reduce rapid transitions between the first and second operation modes, the computer 105 determines the second operation mode transition location 210, and when the location of the host vehicle 101 is between the first operation mode transition location 205 and the second operation mode transition location 210, the computer 105 maintains a current operation mode. That is, upon determining the new first and second operation mode transition locations 205, 210, the computer 105 can transition the host vehicle 101 from the first operation mode to the second operation mode when the new first operation mode transition location 205 is between a new current location of the host vehicle 101 and the operation mode transition boundary location 200. Further, the computer 105 can transition the host vehicle 101 from the second operation mode to the first operation mode when the new second operation mode transition location 210 is between the current location of the host vehicle 101 and the operation mode transition boundary location 200.

Upon transitioning to the second operation mode that is the semiautonomous mode or the limited autonomous mode, the computer 105 can instruct an occupant to engage one or more components 120 of the host vehicle 101. By engaging the components 120, the occupant can assume manual control of the host vehicle 101 operating in the semiautonomous mode or the limited autonomous mode. For example, the computer 105 can instruct the occupant to engage a steering wheel 120 of the host vehicle 101. The computer 105 can, upon determining to transition to the semiautonomous mode or the limited autonomous mode, provide a message via a human-machine interface (HMI) to the occupant to engage on the steering wheel 120, e.g., to place a hand on the steering wheel 120. The computer 105 can detect the hand of the occupant on the steering wheel 120 when a torque sensor 110 on a steering column detects a torque on the steering wheel 120 exceeding a threshold, e.g., an empirically determined average torque applied to test steering wheels 120 by test occupants when steering according to test routes. Alternatively or additionally, the computer 105 can detect the hand of the occupant on the steering wheel 120 when a capacitive sensor 110 in the steering wheel 120 detects a change in capacitance above a capacitance threshold determined by empirically testing occupant hands on test capacitive sensors 110. Yet alternatively or additionally, the computer 105 can detect the occupant engaging the steering wheel 120 by actuating a camera 110 in a passenger cabin of the vehicle 101, collecting image data 115 of the occupant, and using a conventional image processing technique such as Canny edge detection to identify the hand of the occupant engaging the steering wheel 120. The computer 105 can complete transition to the semiautonomous mode or the limited autonomous mode upon detecting the hand of the occupant on the steering wheel 120. When the host vehicle 101 is in the autonomous mode or the fully autonomous mode and the current location of the host vehicle 101 is between the first operation mode transition location 205 and the operation mode transition boundary location 200, the computer 105 can suppress the message to the occupant and immediately transition to the semiautonomous mode or the limited autonomous mode, as described below.

FIG. 2 illustrates operation of the host vehicle 101 in five scenarios 215, shown as 215a, 215b, 215c, 215d, 215e. As the host vehicle 101 approaches the operation mode transition boundary location 200, changes to the speed v can cause the first and second operation mode transition locations 205, 210 to move as mentioned above. The scenarios 215a-215e illustrate the computer 105 operating the host vehicle 101 according to the moving transition locations 205, 210. In the scenario 215a, the second operation mode transition location 210 is between the current location of the host vehicle 101 and the boundary location 200. The host vehicle 101 operates in the autonomous mode. In the scenario 215b, the host vehicle 101 moves past the second operation mode transition location 210 but has not reached the first operation mode transition location 205. Thus, the host vehicle 101 remains in the autonomous mode. In the scenario 215c, the host vehicle 101 reaches the first operation mode transition location 205 and the computer 105 transitions from the autonomous mode to the semiautonomous mode. In the scenario 215d, the speed v of the host vehicle 101 changes, and the computer 105 determines new first and second operation mode transition locations 205, 210. The new first operation mode transition location 205 is between the host vehicle 101 and the boundary location 200. However, because the host vehicle 101 is still between the first and second operation mode transition locations 205, 210, the computer 105 maintains the current operation mode, i.e., the semiautonomous mode. Then, in the scenario 215e, the host vehicle 101 reaches the first operation mode transition location 205 and remains in the semiautonomous mode.

FIG. 3 illustrates a plurality of scenarios 300a-300g for operating the host vehicle 101 when, in response to an updated second operation mode transition location 210, the computer 105 transitions from the semiautonomous mode to the autonomous mode. In the scenario 300a, the second operation mode transition location 210 is between the host vehicle 101 and the boundary location 200, and the host vehicle 101 is in the autonomous mode. In the scenario 300b, the host vehicle 101 is between the first and second operation mode transition locations 205, 210, and the host vehicle 101 remains in the autonomous mode. In the scenario 300c, the host vehicle 101 reaches the first operation mode transition location 205 and the computer 105 transitions from the autonomous mode to the semiautonomous mode. In the scenario 300d, the computer 105 determines a new host vehicle 101 speed v and new first and second operation mode transition locations 205, 210, and the host vehicle 101 is still in the semiautonomous mode. The second operation mode transition location 210 is between the location of the host vehicle 101 and the boundary location 200. Thus, as shown in the scenario 300e, the computer 105 transitions the host vehicle 101 from the semiautonomous mode to the autonomous mode. Then, in the scenario 300f, the host vehicle 101 is between the first and second operation mode transition locations 205, 210 and remains in the autonomous mode. In the scenario 300g, the host vehicle 101 reaches the first operation mode transition location 205 and the computer 105 transitions the host vehicle 101 from the autonomous mode to the semiautonomous mode.

FIG. 4 illustrates a plurality of scenarios 400a-400d for operating the host vehicle 101 when, in response to an updated first operation mode transition location 205, the computer 105 transitions from the autonomous mode to the semiautonomous mode. In the scenario 400a, the first and second operation mode transition locations 205, 210 are between the location of the host vehicle 101 and the boundary location 200. In the scenario 400b, the host vehicle 101 passes the second operation mode transition location 210 and remains in the autonomous mode until reaching the first operation mode transition location 205. However, as shown in scenario 400c, upon determining a new speed v, the computer 105 can determine new first and second operation mode transition locations 205, 210 such that the host vehicle 101 would have already reached the first operation mode transition location 205. That is, according to the new first and second operation mode transition locations 205, 210, the host vehicle 101 would be in the semiautonomous mode but is currently in the autonomous mode because the previously determined transition locations 205, 210 specified that the host vehicle 101 be in the autonomous mode. Because the host vehicle 101 is now past the first operation mode transition location 205, the computer 105 determines to transition from the autonomous mode to the semiautonomous mode. As described above, the computer 105 may suppress one or more operations for operator engagement prior to transitioning to the semiautonomous mode, e.g., the computer 105 may suppress a message to instruct the occupant to engage the steering wheel 120, the computer 105 may complete transition to the semiautonomous mode before detecting the hand of the occupant on the steering wheel 120, etc.

Upon reaching the operation mode transition boundary location 200, the computer 105 can identify a second operation mode transition boundary location 200 and transition from the semiautonomous mode to the autonomous mode upon reaching the second operation mode transition boundary location 200. That is, the operation mode transition boundary location 200 can be a location at a start of a portion of a roadway that requires additional attention, e.g., a location at which a curvature of a roadway exceeds a curvature threshold, as described above. The second operation mode transition boundary location 200 can be a location at the end of the portion of the roadway that requires additional attention, e.g., a location at which the curvature of the roadway is below the curvature threshold. At the second operation mode transition boundary location 200, the computer 105 can transition the host vehicle 101 from the semiautonomous mode to the autonomous mode.

In the examples described above, the computer 105 can transition the host vehicle 101 to the manual mode. That is, when full manual control is requested by the occupant or preferred for operation in a current location, after transitioning from the autonomous mode to the semiautonomous mode, the computer 105 can transition from the semiautonomous mode to the manual mode upon reaching the first operation mode transition location 205. Thus, when the host vehicle 101 approaches the operation mode transition boundary location 200, the occupant can assume full manual control of the host vehicle 101.

The computer 105 can determine a minimum transition distance $D_{min}$ that is a minimum distance at which the computer 105 can transition at least one component 120 to the semiautonomous mode. That is, when the computer 105 determines the first operation mode transition location 205 based on a current vehicle 101 speed v such that the location of the host vehicle 101 is between the first operation mode transition location 205 and the boundary location 200, the computer 105 may not have enough time to completely transition components 120 to the semiautonomous mode. The computer 105 can determine a location at the minimum transition distance $D_{min}$ at which the computer 105, if the host vehicle 101 is in the autonomous mode, transitions a minimum number of components 120 to the semiautonomous mode (e.g., only one of the steering, brake, or propulsion). The computer 105 can determine a modified distance $D'_1$ and the first boundary transition location 205 based on the minimum transition distance $D_{min}$:

$$D'_1 = vT_1 + D_{min}\left(1 - \frac{v}{v_{max}}\right) \quad (1)$$

where $v_{max}$ is a maximum speed of the host vehicle 101, e.g., a posted speed limit. The minimum transition distance $D_{min}$ can be a predetermined value determined as the maximum speed $v_{max}$ multiplied by the maximum empirically tested time to transitioning one of the components 120 to the semiautonomous mode.

Figure 5:
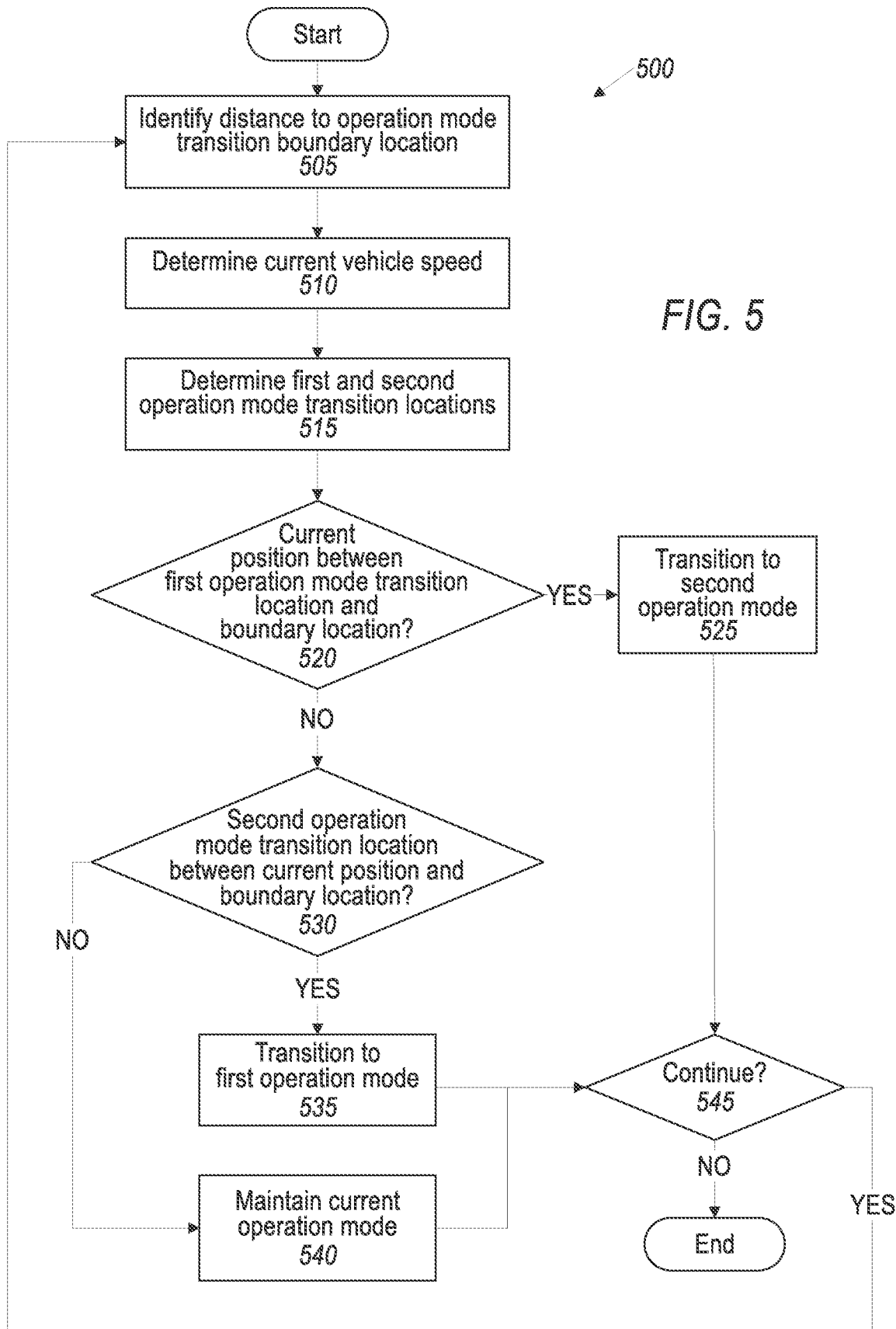
FIG. 5 is a block diagram of an example process for operating the host vehicle.

FIG. 5 is a block diagram of an example process 500 for operating a vehicle 101. The process 500 begins in a block 505, in which a computer 105 identifies a distance D between a location of the host vehicle 101 and an operation mode boundary transition location 200. As described above, the operation mode boundary transition location 200 is a location at which the host vehicle 101 that is currently operating in a first operation mode should operate in a second operation mode, e.g., a semiautonomous mode, a limited autonomous mode, etc. For example, the operation mode boundary transition location 200 can be a location where a curvature of a roadway exceeds a curvature threshold, as described above.

Next, in a block 510, the computer 105 determines a current vehicle 101 speed. As described above, the host vehicle 101 speed determines an amount of time before reaching the operation mode boundary transition location 200. That is, based on the current vehicle 101 speed, the computer 105 can determine when to transition from the first operation mode to the second operation mode to operate in the second operation mode upon reaching the operation mode boundary transition location 200.

Next, in a block 515, the computer 105 determines first and second operation mode transition locations 205, 210. As described above, the first operation mode transition location 205 is based on a time to transition $T_1$ from the first operation mode to the second operation mode and a current vehicle 101 speed v, i.e., the first operation mode transition location is a distance $D_1 = v \cdot T_1$ from the operation mode transition boundary location 200. The second operation mode transition location 210 is based on a minimum time to remain in the second operation mode after transitioning from the first operation mode to the second operation mode, as described above, and the current vehicle 101 speed.

Next, in a block 520, the computer 105 determines whether a current position of the host vehicle 101 is between the first operation mode transition location 205 and the operation mode boundary transition location 200. That is, upon reaching the first operation mode transition location 205 or determining that the host vehicle 101 has already passed the first operation mode transition location 205, the computer 105 can transition the host vehicle 101 from the first operation mode to the second operation mode. If the computer 105 determines that the host vehicle 101 is between the first operation mode transition location 205 and the operation mode boundary transition location 200, the process 500 continues in a block 525. Otherwise, the process 500 continues in a block 530.

In the block 525, the computer 105 transitions to the second operation mode. For example, when the second operation mode is a semiautonomous mode, the computer 105 restores manual control to at least one of the steering, brake, and propulsion for operation by the occupant. Thus, when the host vehicle 101 reaches the operation mode transition boundary location 200, the host vehicle 101 operates in the second operation mode.

In the block 530, the computer 105 determines whether the second operation mode transition location 210 is between the host vehicle 101 and the operation mode transition boundary location 200. When the second operation mode transition location 210 is between the host vehicle 101 and the boundary location 200, the host vehicle 101 is in a portion of the roadway where operation in the first operation mode is allowed and has sufficient time (e.g., the transition time $T_1$) to complete transition from the first operation mode to the second operation mode. If the second operation mode transition location 210 is between the host vehicle 101 and the boundary location 200, the process 500 continues in a block 535. Otherwise, the process 500 continues in a block 540.

In the block 535, the computer 105 transitions the host vehicle 101 to the first operation mode. As described above, when the first operation mode is an autonomous mode, the host vehicle 101 is in a portion of the roadway where autonomous mode operation is allowed and has sufficient time to transition to the semiautonomous mode (i.e., the second operation mode) prior to reaching the boundary location 200. Because the second operation mode transition location 210 is between the host vehicle 101 and the boundary location 200, the host vehicle 101 will remain in the first operation mode for at least the specified time, as described above, defining the second operation mode transition location 210.

In the block 540, the computer 105 maintains a current operation mode. That is, the computer 105 determines that the host vehicle 101 is between the first and second operation mode transition locations 205, 210, and to reduce the number of times that the computer 105 transitions between the operation modes, the computer 105 maintains the current operation mode. For example, if the host vehicle 101 was in the semiautonomous mode and, upon determining the first and second operation mode transition locations 205, 210, the host vehicle 101 is now between the first and second operation mode transition locations 205, 210, the computer 105 continues to operate the host vehicle 101 in the semiautonomous mode. Thus, when updating the first and second operation mode transition locations 205, 210 based on new determinations of the host vehicle 101 speed, the computer 105 can maintain a current operation mode for at least the specified period of time described above.

Next, in a block 545, the computer 105 determines whether to continue the process 500. The computer 105 can determine to continue the process 500 when the host vehicle 101 has not reached the operation mode transition boundary location 200 and the computer 105 continues to update the first and second operation mode transition locations 205, 210 based on new determinations of host vehicle 101 speed. If the host vehicle 101 determines to continue, the process 500 returns to the block 505. Otherwise, the process 500 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer including a processor and a memory, the memory storing instructions executable by the processor to:
   determine, for a host vehicle operating in a first operation mode, a first operation mode transition location based on a time to transition the host vehicle from the first operation mode to a second operation mode, a current speed of the host vehicle, and a distance from the host vehicle to an operation mode transition boundary location;
   determine a second operation mode transition location that is a specified distance from the first operation mode transition location, the specified distance based on the current host vehicle speed, wherein the first operation mode transition location is between the operation mode transition boundary location and the second operation mode transition location;
   transition from the first operation mode to the second operation mode upon reaching the first operation mode transition location; and
   transition from the second operation mode to the first operation mode upon determining a new second operation mode transition location that is between a current location of the host vehicle and the operation mode transition boundary location.

2. The system of claim 1, wherein the instructions further include instructions to actuate a brake to slow the host vehicle below a speed threshold upon transitioning from the first operation mode to the second operation mode.

3. The system of claim 1, wherein the instructions further include instructions to, after determining the first and second operation mode transition locations, determine a new speed of the host vehicle and to then determine a new first operation mode transition locations and the new second operation mode transition location based on the new speed.

4. The system of claim 3, wherein the instructions further include instructions to, upon determining the new first and second operation mode transition locations, maintain the second operation mode or the first operation mode when a current location of the host vehicle is between the new first and second operation mode transition locations.

5. The system of claim 3, wherein the instructions further include instructions to, upon determining the new first and second operation mode transition locations, transition from the first operation mode to the second operation mode when a new current location of the host vehicle is between the new first operation mode transition location and the operation mode transition boundary location and to transition from the second operation mode to the first operation mode when the new second operation mode transition location is between the current location of the host vehicle and the operation mode transition boundary location.

6. The system of claim 1, wherein the instructions further include instructions to, upon transitioning to the second operation mode, instruct an occupant to engage a steering wheel.

7. The system of claim 6, wherein the instructions further include instructions to complete transition to the second operation mode upon detecting a hand of the occupant on the steering wheel.

8. The system of claim 7, wherein the instructions further include instructions to detect the hand of the occupant on the steering wheel when a torque sensor detects a torque on the steering wheel exceeding a threshold.

9. The system of claim 7, wherein the instructions further include instructions to detect the hand of the occupant on the steering wheel when a capacitive sensor detects a change in capacitance exceeding a threshold.

10. The system of claim 1, wherein the instructions further include instructions to, upon determining to transition to the second operation mode, provide a message to an occupant to engage a steering wheel.

11. The system of claim 10, wherein the instructions further include instructions to, when the host vehicle is in the autonomous mode and the current location of the host vehicle is between the first operation mode transition location and the operation mode transition boundary location, suppress the message to the occupant and transition to the second operation mode.

12. The system of claim 1, wherein the instructions further include instructions to, upon reaching the operation mode transition boundary location, identify a second operation mode transition boundary location and transition from the second operation mode to the first operation mode upon reaching the second operation mode transition boundary location.

13. The system of claim 1, wherein the instructions further include instructions to, after transitioning from the first operation mode to the second operation mode upon reaching the first operation mode transition location, transition from the second operation mode to a manual mode.

14. The system of claim 1, wherein the operation mode transition boundary location is a location at which a curvature of a roadway exceeds a curvature threshold.

15. A method, comprising:
    determining, for a host vehicle operating in a first operation mode, a first operation mode transition location based on a time to transition the host vehicle from the first operation mode to a second operation mode, a current speed of the host vehicle, and a distance from the host vehicle to an operation mode transition boundary location;
    determining a second operation mode transition location that is a specified distance from the first operation mode transition location, the specified distance based on the current host vehicle speed, wherein the first operation mode transition location is between the operation mode transition boundary location and the second operation mode transition location;
    transitioning from the first operation mode to the second operation mode upon reaching the first operation mode transition location; and
    transitioning from the second operation mode to the first operation mode upon determining a new second operation mode transition location that is between a current location of the host vehicle and the operation mode transition boundary location.

16. The method of claim 15, further comprising, after determining the first and second operation mode transition locations, determining a new speed of the host vehicle and determining a new first operation mode transition locations and the new second operation mode transition location based on the new speed.

17. The method of claim 16, further comprising, upon determining the new first and second operation mode transition locations, maintaining the second operation mode or the first operation mode when a current location of the host vehicle is between the new first and second operation mode transition locations.

18. The method of claim 16, further comprising, upon determining the new first and second operation mode transition locations, transitioning from the first operation mode to the second operation mode when a new current location of the host vehicle is between the new first operation mode transition location and the operation mode transition boundary location and transitioning from the second operation mode to the first operation mode when the new second operation mode transition location is between the current location of the host vehicle and the operation mode transition boundary location.

19. The method of claim 15, further comprising, upon transitioning to the semiautonomous mode, instructing an occupant to engage a steering wheel.

20. The method of claim 15, wherein the specified distance between the first and second operation mode transition locations is based on a specified minimum time to remain in the second operation mode.

* * * * *